No. 724,676. PATENTED APR. 7, 1903.
H. DERRER.
LATHE FOR TURNING IRREGULAR FORMS.
APPLICATION FILED MAY 24, 1901.
NO MODEL. 2 SHEETS—SHEET 1.
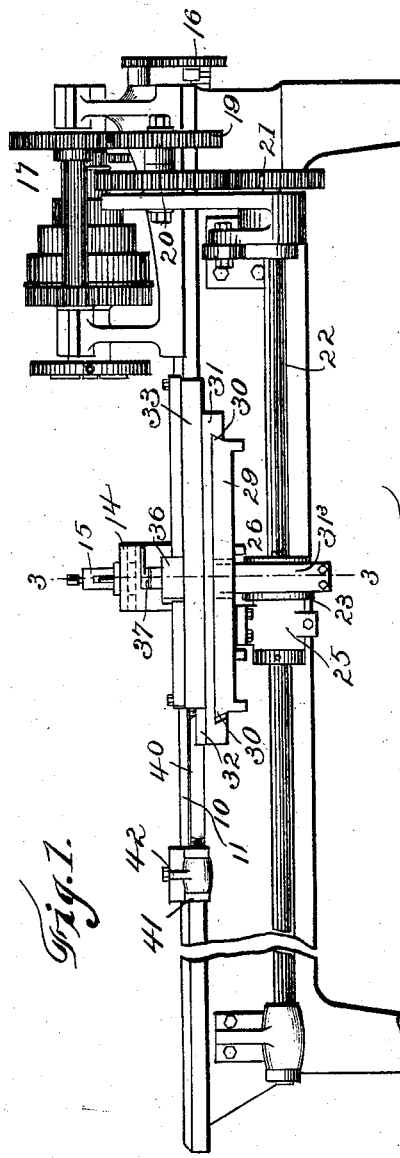
Fig. 1.
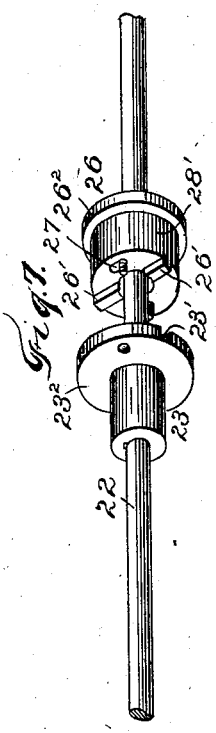
Fig. 7.
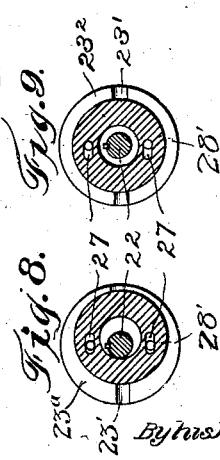
Fig. 9.
Fig. 8.
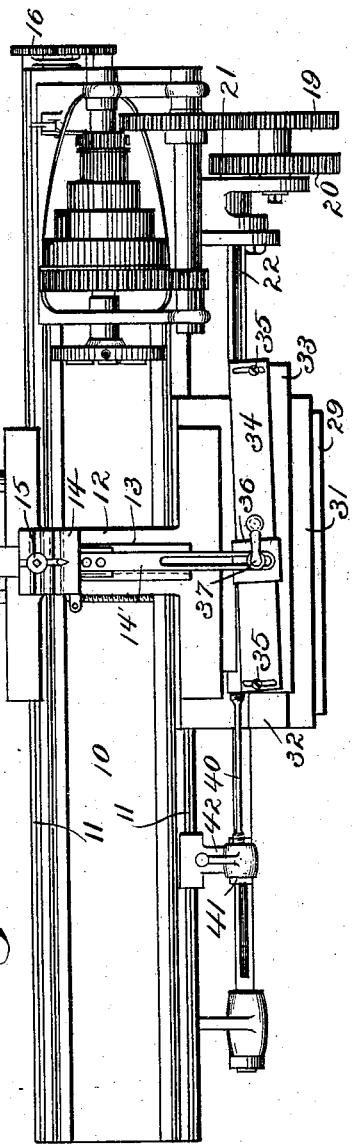
Fig. 2.
Witnesses.
Frank G. Campbell
C. A. Jarvis
Inventor:
H. Derrer.
By his Attorney, F. A. Richards.

No. 724,676. PATENTED APR. 7, 1903.
H. DERRER.
LATHE FOR TURNING IRREGULAR FORMS.
APPLICATION FILED MAY 24, 1901.
NO MODEL. 2 SHEETS—SHEET 2.
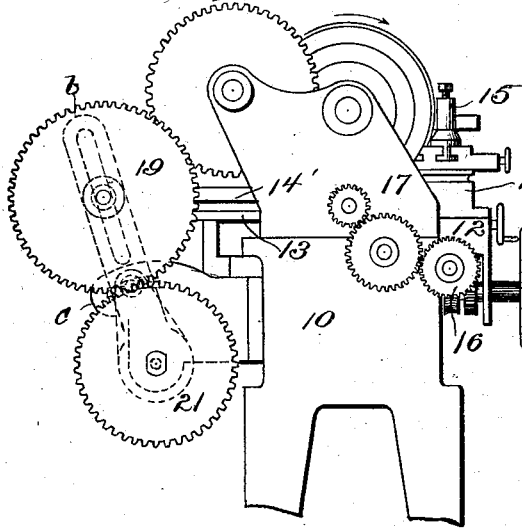
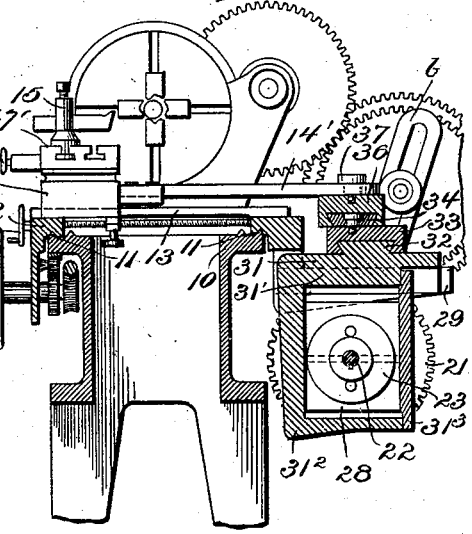
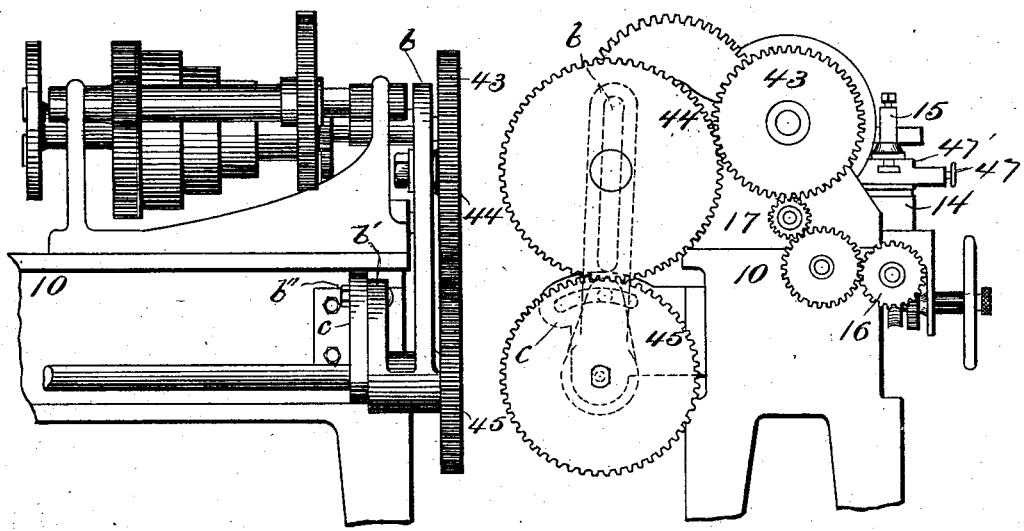
Witnesses.
Frank J Campbell
C. A. Jarvis
Inventor.
H. Derrer:
By his Attorney,
F H Richards.

UNITED STATES PATENT OFFICE.

HENRY DERRER, OF SAULT STE. MARIE, CANADA.

LATHE FOR TURNING IRREGULAR FORMS.

SPECIFICATION forming part of Letters Patent No. 724,676, dated April 7, 1903.

Application filed May 24, 1901. Serial No. 61,702. (No model.)

*To all whom it may concern:*

Be it known that I, HENRY DERRER, a subject of the King of Great Britain, residing in Sault Ste. Marie, Ontario, Canada, have invented certain new and useful Improvements in Lathes for Turning Irregular Forms, of which the following is a specification.

This invention relates to lathes, and more particularly to lathes for turning irregular forms; and it has for its object to provide a lathe adapted to turn work of either circular or irregular shape in cross-section and at the same time of either a cylindrical or tapered form.

My present invention is along the general lines of that disclosed in United States Letters Patent granted to me June 4, 1901, and numbered 675,469.

Another object of my invention is to apply to a lathe of any ordinary or convenient form mechanism adapted to reciprocate the tool a predetermined number of times to every revolution of the work to cause it to turn a desired form in cross-section and, if desired, to cause the tool as it advances to follow a line off the parallel of the work-centers.

In adapting to a lathe the mechanism used for the purposes above mentioned all of the members of the latter which are movable longitudinally of the lathe are by my invention mounted below the plane of the surface of the reciprocatable tool-holder, which is ordinarily termed the "slide-rest," thus leaving the upper part of the tool-carriage unincumbered by parts which might otherwise prove obstructive to the mounting of work on the lathe and to the free admission of light from the back of the lathe, matters which lathe-operators deem important. Furthermore, my invention very materially simplifies the construction of a lathe of the class mentioned by eliminating the gearing sometimes used to connect the reciprocator to a drive-shaft or by substituting a drive-shaft mounted wholly within the limits of the lathe-bed for one which has heretofore been used in the absence of the above-mentioned gearing and which protrudes longitudinally from the end of the lathe-bed, and thus entails for the operation of the lathe the requirement of a larger amount of space than would otherwise be necessary, and I effect such a simplification of the mechanism without substituting therefor levers or cognate devices which involve the use of moving joints, which by wear may become inaccurately operative. In my invention the reciprocatable parts may all be rigidly connected one with another.

I contemplate employing any suitable lathe having spindles and a carriage or cross-head mounted on ways or shears, a tool properly mounted on the carriage in any convenient manner and adapted to be advanced along the ways by any suitable means, generally a screw being employed, and the tool also being adapted to be reciprocated in a direction transverse to the ways by an eccentric mounted either upon the frame of the machine or upon the carriage. Any other desirable means for imparting reciprocating movement may be employed, if found expedient in practice. In connection with this reciprocating movement the mounting of the tool will be such that as it is advanced by the screw or other means along the ways it will move in a line either parallel with the work-centers or in a line off such parallel to either give the work a parallel contour or a tapering contour.

In the drawings the invention is shown as applied to a lathe wherein the carriage or cross-head moves on ways by means of a screw, and on the cross-head is mounted a tool-slide carrying a tool, and in connection with the carriage are a series or set of slide members and ways adapted to be set either parallel to the main ways or to be turned off the parallel to produce a taper turn, and in connection with the tool-slide is provided a diametrally-adjustable hollow cylinder for the purpose of reciprocating the tool, the hollow cylinder being mounted to reciprocate the tool as it advances, whether it is being advanced parallel or otherwise.

In the drawings accompanying and forming part of this specification the invention is shown as applied to a lathe in a form which may be preferred.

Figure 1 is a side elevation of a lathe embodying one form of this invention applied thereto. Fig. 2 is a plan view thereof. Fig. 3 is a cross-section on line 3 3, Fig. 1, looking toward the right. Fig. 4 is an end elevation, the scale being somewhat enlarged. Figs. 5 and 6 show another form of means for driving the taper and eccentric mechanism. Fig. 7 shows a rotatable shaft on which is mounted a member adjustable diametrally of the axis of its rotation, the parts being separated to show the construction; and Figs. 8 and 9 are views of the movable part of said device in two different positions.

10 is the bed of the lathe, here represented as of the usual form and shown having the usual ways or shears 11, on which may be mounted any convenient form of carriage, such as 12, having ways 13, on which may be mounted a suitable tool-carrier comprising a tool-slide 14, reciprocatable transversely of the carriage 12, a reciprocatable tool-holder 47', mounted on said tool-slide 14 and having a feed-screw (not shown) to which is fixed a hand-wheel 47 and a tool-post 15, which carriage is mounted for movement back and forth upon the ways 11 by a screw in the usual manner, the latter having mounted thereon at one end a gear 16, which meshes with the usual form of lathe-gearing, (designated generally by 17.) The back gearing is shown in Figs. 3 and 4 as engaging, by means of intermediate gear-wheels 19 20, with a pinion 21, keyed on a shaft 22, which is journaled in hangers secured to the frame of the lathe. An eccentric attachment adapted to reciprocate the cross-slide in the carriage comprises a flanged collar 23, forming a journal member rotating with but longitudinally movable on the shaft 22 and grooved diametrically across the flanged side, forming a recess 23', in which engage projections 26', formed on a diametrally-adjustable member of said attachment, said member being herein represented as a hollow flanged cylinder 26, which has a bore of larger diameter than the diameter of the shaft 22, which passes through it. The collar 26 may be secured to the collar 23 by binding-screws, which pass through the collar 26 in slots 27, said slots allowing a diametrical adjustment of the collar 26 either concentrically with or eccentrically to the shaft 22. The hub of the collar 23 is journaled in a hanger 25, secured to a second slide member 31, mounted on the carriage and reciprocatable transversely of the latter in a path parallel with that of the tool-slide 14.

In the drawings have been shown a convenient form and organization of slide members for conveying the irregular and taper-forming movements to a tool-slide. The organization here shows the carriage 12 of the lathe as extended to form a bed-plate for carrying the irregular and taper mechanism, said bed-plate being shown as provided with ways 30, on which is mounted a second slide member or slide 31, carrying ways 32, parallel to the axis of the lathe centers and at right angles to the ways 30. On the ways 32 is located a slide 33, also parallel to said axis, which slide 33 also carries member 34, adjustable angularly of the lathe-shears and pivoted to the center of the slide 33 by a pivot passing through its center and having at each end thereof segmental slots through which pass binding-screws 35, entering tapped holes in the slide 33, on which member 34 is mounted a slide-block 36, which has a clamping-screw 37, adapted to traverse a slotted bar or arm 14', projecting from the tool-slide 14.

A housing is fixed to the under face of the slide 31 and comprises an angle-plate 31², which, with the under face of the slide 31, forms a recess which opens outwardly, said recess being inclosed by a covering-plate 31³, all of the parts mentioned being firmly joined together, as shown. In the housing is movably fitted a rectangular box 28, which may be reciprocated in said housing transversely relative to either path of the tool which is secured in the tool-post 15. In the box 28 is journaled the body 28' of the diametrally-adjustable flanged collar 26. The plate 29, which may be integral with the carriage 12, is slotted to admit the housing and permit the reciprocation of the latter therein transversely of the lathe. The slide 32 is indirectly connected with the tool-slide 14 by a bar 14' and the members intervening between the latter and said slide 32.

In Figs. 5 and 6 the shaft 22 is shown as being geared up directly with the main spindle by means of a train of gears 43 44 45, the several wheels in which may be changed about one for another in a like manner with those shown in Figs. 3 and 4, where the back gear is shown geared up to the shaft 22 and for a purpose hereinafter related.

The operation of the lathe is as follows: If it is desired to use the lathe in the ordinary manner, having the tool move on the shears or ways by the screw and the tool advanced in the ordinary manner by the hand-wheels 46 47, the eccentric may be thrown out of gear or it may be placed in a position so that its members are concentric to the shaft and the pivoted way 34, set by means of set-screws in a position parallel with the main ways or shears. If, however, it is desired to use the lathe for turning irregular shapes, the member 26 may be placed in a position eccentric to the other member by loosening the binding-screws and sliding the diametrally-adjustable cylinder on the journal member to the desired position and turning down the binding-screws, in which position upon the rotation of the shaft the diametrally-adjustable cylinder 26 will act on the housing and by means of the latter will reciprocate the second slide member 31, to which the housing is secured, and also the slides 33 and 36 and the block 37, which is connected by the bar 14' to the tool-slide 14, in which is mounted the reciprocatably-adjustable tool-holder 47'. In the tool-holder 47' is mounted a tool in a tool-post 15. It will thus be seen that by means of the connecting members shown and described each complete rotation of the diametrally adjustable member 26 may cause a to-and-fro movement of the tool which is secured in the tool-post 15.

The transverse conformation of the resultant product relative to the axis of the lathe-spindle may be predetermined by a combined adequate adjustment of the diametrally-adjustable member 26 and adequate adaptation of the ratio of the gearing on the lathe-spindle to that of the gearing on the shaft 22.

In order to secure the last-named result, the several gear-wheels 19 21, as shown in Figs. 3 and 4, or 43, 44, and 45, as shown in Figs. 5 and 6, may be changed about, as before mentioned, a slotted swinging bracket $b$, secured in the required position by a binding-screw $b''$, which binds an arm $b'$ of the bracket $b$ to a fixed arm $c$, serving as a radially and oscillatively adjustable mount for the intermediate wheel which may be used in the combination effected.

If it be desired to combine a taper form with this irregular turn, it may be accomplished by adjusting the angularly-adjustable guide-bar 34 on its pivot and securing said bar in its required position by means of the binding-screws 35. The slide-block 36 will then be caused to travel along the guide-bar 34 as the screw advances the carriage, moving, by means of the connecting-bar 14', the slide-block 36 along the guide-bar 34 and either toward or from the work-center, according to the direction in which it is set, the center line of reciprocation being constantly changed relatively to the work-center and the flanged cylinder being carried longitudinally of the lathe by the engagement of the sides of the box 28 with the flanges on the former and on the journal member 23, respectively.

If it be desired to form a taper without the irregular surface and to have a conical outline with the ways arranged as previously described, the cylinder 26 should be concentrically adjusted relatively to the shaft 22, when there will be no reciprocation of the tool-slide 14.

The term "taper bar" where used herein is intended to apply to a guiding member which being suitably adjusted relative to the ways of the lathe guides the lathe-tool in a path which will have a predetermined angular relation to the axis of the lathe-spindle and of the material to be operated upon.

For securing the angularly-adjustable taper or tool-guide against movement longitudinally of the bed, I employ any suitable means—such, for instance, as the bar 40, Fig. 2, on which is a screw-sleeve 41, clamped in a hanger 42, supported by the frame.

Having described my invention, I claim—

1. In a lathe for turning irregular forms, the combination of a longitudinally-movable carriage; a transversely-movable tool-slide mounted thereon; an angularly-adjustable tool-guide fixed against movement longitudinally of the lathe; a connection from the said tool-guide to the tool-slide; and means for imparting reciprocatory motion to said tool-guide.

2. In a lathe for turning irregular forms, the combination of a longitudinally-movable carriage; a transversely-movable tool-slide mounted thereon; a second transversely-movable slide mounted on the carriage; an angularly-adjustable tool-guide mounted thereon, and fixed against movement longitudinally of the lathe; a connection from said tool-guide to the tool-slide; and means for imparting reciprocatory motion to said second transversely-movable tool-slide.

3. In a lathe for turning irregular forms, the combination of a longitudinally-movable carriage; a transversely-movable tool-slide mounted thereon; a second transversely-movable slide mounted on the carriage; an angularly-adjustable tool-guide mounted thereon and fixed against movement longitudinally of the lathe; a housing mounted on the second transversely-movable slide; a journal-box reciprocatably mounted in the housing; a member journaled therein for imparting reciprocatory motion to the second transversely-movable slide; and a connection from the tool-guide to the tool-slide.

4. In a lathe for turning irregular forms; the combination of a longitudinally-movable carriage; a transversely-movable tool-slide mounted thereon; an angularly-adjustable tool-guide fixed against movement longitudinally of the lathe; an adjustable connection from said tool-guide to the tool-slide; and means for imparting reciprocatory motion to said tool-guide.

5. In a lathe for turning irregular forms, the combination of a longitudinally-movable carriage; a transversely-movable tool-slide mounted thereon; a second transversely-movable slide mounted on the carriage; an angularly-adjustable tool-guide mounted thereon, and fixed against movement longitudinally of the lathe; an adjustable connection from said tool-guide to the tool-slide; and means for imparting reciprocatory motion to said second transversely-movable tool-slide.

6. In a lathe for turning irregular forms, the combination of a longitudinally-movable carriage; a transversely-movable tool-slide mounted thereon; a second transversely-movable slide mounted on the carriage; an angularly-adjustable tool-guide mounted thereon and fixed against movement longitudinally of the lathe; a housing mounted on the second transversely-movable slide; a journal-box reciprocatably mounted in the housing; a member journaled therein for imparting reciprocatory motion to the second transversely-movable slide; and an adjustable connection from the tool-guide to the tool-slide.

HENRY DERRER.

Witnesses:
W. H. MUNRO,
A. E. STEWART.